(12) United States Patent
Chen et al.

(10) Patent No.: US 11,838,490 B2
(45) Date of Patent: Dec. 5, 2023

(54) MULTIMODAL IMAGING SENSOR CALIBRATION METHOD FOR ACCURATE IMAGE FUSION

(71) Applicant: Logistics and Supply Chain MultiTech R&D Centre Limited, Pok Fu Lam (HK)

(72) Inventors: Hung Kwan Chen, Pok Fu Lam (HK); Chi Hung Tong, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 527 days.

(21) Appl. No.: 17/254,564

(22) PCT Filed: Jun. 29, 2018

(86) PCT No.: PCT/CN2018/093677
§ 371 (c)(1),
(2) Date: Dec. 21, 2020

(87) PCT Pub. No.: WO2020/000369
PCT Pub. Date: Jan. 2, 2020

(65) Prior Publication Data
US 2021/0274150 A1 Sep. 2, 2021

(51) Int. Cl.
*H04N 13/246* (2018.01)
*G06T 7/80* (2017.01)
*G06T 7/30* (2017.01)
*G06T 3/40* (2006.01)

(52) U.S. Cl.
CPC ............ *H04N 13/246* (2018.05); *G06T 3/40* (2013.01); *G06T 7/30* (2017.01); *G06T 7/85* (2017.01); *G06T 2207/10024* (2013.01); *G06T 2207/10028* (2013.01); *G06T 2207/10048* (2013.01); *G06T 2207/20221* (2013.01)

(58) Field of Classification Search
CPC .................................................... H04N 13/246
USPC ..................................................... 348/207.99
See application file for complete search history.

(56) References Cited

U.S. PATENT DOCUMENTS

| | | | |
|---|---|---|---|
| 11,555,903 B1 * | 1/2023 | Kroeger | G01S 17/89 |
| 2013/0070108 A1 * | 3/2013 | Aerts | G06T 7/85 |
| | | | 382/103 |
| 2014/0098194 A1 * | 4/2014 | Goma | H04N 13/25 |
| | | | 348/47 |

(Continued)

FOREIGN PATENT DOCUMENTS

WO 2018017904 1/2018

*Primary Examiner* — Joel W Fosselman
(74) *Attorney, Agent, or Firm* — Renner, Kenner, Greive, Bobak, Taylor & Weber

(57) ABSTRACT

A system and a method of calibrating a plurality of digital imaging sensors with different modality for image fusion, comprising the steps of calibrating each digital image generated by a corresponding digital imaging sensor with one or more intrinsic parameters; scaling each digital image at a scaling ratio to generate a scaled digital image which has an overlapping region of interest; cross referencing one or more scaled digital images to derive one or more extrinsic parameters; calibrating each digital imaging sensor with the extrinsic parameters; and transforming and rectifying each digital image such that the region of interest of each digital image is coplanar and aligned.

31 Claims, 7 Drawing Sheets

Images obtained from depth, thermal and RGB camera:

RGB camera

Thermal camera

Depth camera

Characteristic of camera with different modalities:

| | Resolution | FOV |
|---|---|---|
| RGB | 1280x720 | 40°-114.2° x 22.5°-60.6° |
| Thermal | 640x480 | 33°x25° |
| Depth | 320x240 | 74.4°x59.3° |

(56) References Cited

U.S. PATENT DOCUMENTS

2016/0275682 A1 9/2016 Natroshvili
2017/0262971 A1* 9/2017 Liu .......................... G06T 7/85
2017/0294009 A1 10/2017 Pollard

* cited by examiner

Fig. 1

Images obtained from depth, thermal and RGB camera:

Depth camera

Thermal camera

RGB camera

Characteristic of camera with different modalities:

| | Resolution | FOV |
|---|---|---|
| RGB | 1280X720 | 40°-114.2° x 22.5°-60.6° |
| Thermal | 640x480 | 33°x25° |
| Depth | 320x240 | 74.4°x 59.3° |

MULTIMODAL IMAGING SENSOR CALIBRATION METHOD FOR ACCURATE IMAGE FUSION

TECHNICAL FIELD

The present invention relates generally to an apparatus, system, or method for image fusion.

Particularly, although not exclusively, to a method of calibrating multimodal imaging sensor for accurate image fusion.

BACKGROUND

Image fusion (IF) is a technique to integrate complementary multimodal, multitemporal, and/or multiview information into one new image. That new image will contain information the quality of which cannot be achieved otherwise.

There are plenty of application in IF technology. In astronomy, multiple sensors fusion is used to achieve high spatial and spectral resolutions by combining images from two or more sensors: high spatial resolution sensor, IR sensor, and X-Ray senor. Medical imaging uses IF on simultaneous evaluation of CT, MRI, and/or PET images. Military, security, and surveillance applications use multi modal image fusion of visible and infrared images.

SUMMARY OF THE INVENTION

The present invention provides a system and a method of calibrating multimodal camera system with two or more cameras with different field-of-views, resolutions and modalities, and to transform the images based on the calibration for a precise fusion of all the images obtained from the system. Advantageously, the present invention provides a novel calibration method for multi-modal imaging sensors for image fusion.

In accordance with a first aspect of the present invention, there is provided a method of calibrating a plurality of digital imaging sensors with different modality for image fusion, comprising the steps of:

calibrating each digital image generated by a corresponding digital imaging sensor with one or more intrinsic parameters;

scaling each digital image at a scaling ratio to generate a scaled digital image which has an overlapping region of interest;

cross referencing one or more scaled digital images to derive one or more extrinsic parameters;

calibrating each digital imaging sensor with the extrinsic parameters; and transforming and rectifying each digital image such that the region of interest of each digital image is coplanar and aligned.

Preferably, the method further comprises the step of setting a digital imaging sensor as a reference sensor and a digital image generated by the reference sensor as a reference image.

Preferably, each of the plurality of digital imaging sensors is placed in front of an object at a different distance or at a different viewing perspective.

Preferably, each of the plurality of digital imaging sensors is adapted to capture multiple digital images of the object.

Preferably, the method further comprises the step of obtaining the intrinsic parameters of each digital imaging sensors.

Preferably, the intrinsic parameters comprises, but are not limited to, one or more of focal length of the lens, position of an optical centre, and lens distortion.

Preferably, the scaling ratio of each digital image generated by a corresponding digital imaging sensor is equal or substantially equal to the ratio of the focal lengths between the reference sensor and the corresponding digital image sensor.

Preferably, the extrinsic parameters are obtained by comparing each of the scaled digital images.

Preferably, the extrinsic parameters comprises, but are not limited to, one or more of, sensors angle, relative distance.

Preferably, the rectifying step comprises the step of obtaining from each digital imaging sensors with the image obtained from the reference camera using the extrinsic parameters pair by pair.

Preferably, the rectifying step comprises the step of transformation of an image matrix $\{I_i\}$ of each digital image and the image matrix of the reference image $\{I_r\}$, with transformation matrices $\{T_i\}$ and $\{T_{ri}\}$ respectively, in a pairwise manner, wherein each pair of image owns a pair of transformation matrices $\{T_i\}$ and $\{T_{ri}\}$, such that multiple pairs of digital images are aligned in a coplanar manner.

Preferably, transforming an image matrix $\{I_i\}$ of each digital image with transformation matrices $\{T_{ri}^{-1} T_i\}$, such that all transformed images are aligned on a same plane.

Preferably, the digital imaging sensors comprises one of a RGB camera, an infrared radiation camera, and a depth camera.

In accordance with a second aspect of the present invention, there is provided a processor for calibrating modality images fusion comprising:

a reference digital image sensor having a reference modal feature;

one or more digital image sensors, wherein each of which has a modal feature different to the reference modal feature;

a self-calibration processing unit for calibrating a digital image generated from a sensor with intrinsic parameters of the sensor, and scaling the digital image to obtain an overlapping region of interest; and a multimodal imaging sensor calibration and fusion unit for receiving the scaled images from the self-calibration processing unit;

wherein the multimodal imaging sensor calibration and fusion unit is adapted to cross referencing the scaled digital images to derive one or more extrinsic parameters; calibrate each digital imaging sensor with the extrinsic parameters; and transform and rectify each digital image, such that the region of interest of each digital image is coplanar and aligned.

Preferably, the multimodal imaging sensor calibration and fusion unit is adapted to set a digital imaging sensor as a reference sensor and a digital image generated by the reference sensor as a reference image.

Preferably, each of the digital imaging sensors is placed in front of an object at a different distance or at a different viewing perspective.

Preferably, each of the digital imaging sensors is adapted to capture multiple digital images of the object.

Preferably, the self-calibrating unit is adapted to obtain the intrinsic parameters of each digital imaging sensors.

Preferably, the intrinsic parameters comprises, but are not limited to, one or more of focal length of the lens, position of an optical centre, and lens distortion.

Preferably, the scaling ratio of each digital image generated by a corresponding digital imaging sensor is equal or substantially equal to the ratio of the focal lengths between the reference sensor and the corresponding digital image sensor.

Preferably, the extrinsic parameters are obtained by comparing each of the scaled digital images.

Preferably, the extrinsic parameters comprises, but are not limited to, one or more of depth of the object, sensors angle, relative distance.

Preferably, the multimodal imaging sensor calibration and fusion unit is adapted to obtain the transformation matrices of the image obtained from each digital imaging sensors and the image obtained from the reference camera using the extrinsic parameters pair by pair.

Preferably, the multimodal imaging sensor calibration and fusion unit is adapted to carry out the transformation of an image matrix $\{I_i\}$ of each digital image and the image matrix of the reference image $\{I_r\}$, with transformation matrices $\{T_i\}$ and $\{T_{ri}\}$ respectively, in a pairwise manner, wherein each pair of image owns a pair of transformation matrices $\{T_i\}$ and $\{T_{ri}\}$, such that multiple pairs of digital images are aligned in a coplanar manner.

Preferably, transforming an image matrix $\{I_i\}$ of each digital image with transformation matrices $\{T_{ri}^{-1}T_i\}$, such that all transformed images are aligned on a same plane.

Preferably, the digital image sensors are connected to the self-calibrating unit through a wired or wireless connection.

Preferably, the digital image sensors are connected to the self-calibrating unit through an ethernet connection.

Preferably, the digital image sensors are connected to the self-calibrating unit through a WiFi connection.

Preferably, the self-calibrating unit comprises a plurality of individual calibrating modules, each of the calibrating modules is integrated with a digital imaging sensor.

Preferably, the digital imaging sensors comprises one of a RGB camera, an infrared radiation camera, and a depth camera.

In accordance with a third aspect of the present invention, there is provided a computer system comprises:

one or more interface for receiving digital images from a plurality of digital imaging sensors;

a processing unit to execute a method comprising the steps of calibrating each digital image generated by a corresponding digital imaging sensor with one or more intrinsic parameters;

scaling each digital image at a scaling ratio to generate a scaled digital image which has an overlapping region of interest;

cross referencing one or more scaled digital images to derive one or more extrinsic parameters;

calibrating each digital imaging sensor with the extrinsic parameters; and transforming and rectifying each digital image such that the region of interest of each digital image is coplanar and aligned.

Other advantages will become apparent when taken into consideration with the following specification and drawings.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised that, multiview fusion techniques may refer to a set of images of the same scene taken by the same sensor but from different viewpoints which are fused to obtain an image with higher resolution or cover broader area than the sensor normally provides or to recover the 3D representation of the scene. The technique may be used in making 3D movies.

The multitemporal IF technique may recognize two different aims. Images of the same scene may be acquired at different times either to find and evaluate changes in the scene or to obtain a less degraded image of the scene. The former aim may be used in medical imaging, especially in change detection of organs and tumors, and in remote sensing for monitoring land or forest exploitation. The acquisition period may be months or years. The latter aim may require different measurements to be much closer to each other, such as in the scale of seconds, and possibly under different conditions.

Without wishing to be bound by theory, multimodal cameras may leverage various cameras' sensing capabilities and integrate their information so as to provide a more comprehensive understanding of the real-world environment. Image fusion may be used to integrate the information from different cameras. This may require one to solve the corresponding problem in computer vision—finding a set of points in one image which can be identified as the same points in another image.

Preferably, multimodal or multiple sensor image fusion may be used to combine relevant information from several images into a single image. The final output image may provide more information than any of the single images as well as reducing the signal-to-noise ratio. The user can collect useful information without gazing at and comparing images from multiple sensors.

An example import image fusion technique is the pixel-level method, which works either in the spatial domain or in the transform domain. The averaging method, maximising method, the Brovey method, principle component analysis (PCA), wavelet transformation, and intensity-hue-saturation (HIS) based methods may also be involved in the pixel-level fusion method.

The prerequisite for carrying out pixel-level fusion is that the images have been acquired by homogeneous sensors, where the sensors are in stereo setting, same modality, same or similar field-of-views (FOVs) and resolutions.

In an example image preprocessing system, the system may comprise an image preprocessing unit coupled to a processing unit to preprocess image slice data. The image preprocessing unit comprises an image fusion module to estimate missing values between different said image slice data, an image stitching module to stitch different said image slice data into stitched image data and a neuronal tracing module to trace centerlines of neurons in said stitched image data through an awarding function, a minimal path deduction process, a polygonal path approximation process or the combination thereof; and a database coupled to said processing unit to store said preprocessed image slice data.

However, this image preprocessing system may be more suitable for handling 3D images where the sensors or cameras are in stereo setting, same modality, same or similar field-of-views (FOVs) and resolutions.

In an example method for fusing multi-temporal image sets to achieve precise spatial co-registration (e.g., matched alignment), the precise alignment or spatial co-registration of imagery is a preprocessing step for change detection, image fusion, and temporal analysis/modelling. The preprocessing technique, referred to as frame center (FC) matching, may enable precise registration between a long series of multitemporal airborne imagery.

In this example, the FC matching procedures comprises the steps of: a) frame-to-frame registration between raw, non-georeferenced image frames; b) frame-to-frame registration with a georeferenced registration base image; and c) frame-to-mosaic registration with a georeferenced mosaic as the base image.

Similar to the previous example, this image preprocessing method also works on the assumption that the sensors have the same modality, same or similar field-of-views (FOVs) and resolutions.

In yet another example, there is provided a fusion method and a device for fusing an infrared image and a visible light dynamic image. The method may comprise the steps of preprocessing the infrared image and the visible light image. The preprocessing including image formats conversion, denoising visible image, image enhancement, and image conversion.

In the image format conversion process, the images are converted into YUV format images. The Y channel of the visible light image is denoised. The infrared image is filtered with a YUV format filtered. Then, the images are enhanced.

Similarly, this image preprocessing method also works on the assumption that the sensors have the same modality, same or similar field-of-views (FOVs) and resolutions.

Preferably, a calibration method may be incorporated for multimodal cameras which have different FOVs and resolutions, where the calibration method is able to find the pixel mapping relationships among the images from multimodal cameras so as to enable accurate image fusion.

In some example embodiments, multi-camera calibration may assume the cameras are of the similar configuration in terms of field-of-view, resolution and modality (the sensing unit is detecting electromagnetic wave in similar spectrum). Alternatively, it may assume that the vision is of a binocular setting which has two cameras placed side-by-side.

However, it is also quite often that cameras with different modalities are of different quantity, FOVs, resolutions may be used. Therefore it is preferable to calibrate more than two cameras with diverse field-of-view, resolution and modality. Without accurate calibration, the images from multiple cameras are unable to be fused with sufficient precision or using the pixel level fusion.

In addition, it is also preferable to solve the same problems (e.g. the pixel mapping function from one image to others) in multi-modal camera systems.

In one embodiment of the present invention, there is provided a method of calibrating a plurality of digital imaging sensors with different modality for image fusion. The method comprises the steps of: calibrating each digital image generated by a corresponding digital imaging sensor with one or more intrinsic parameters; scaling each digital image at a scaling ratio to generate a scaled digital image which has an overlapping region of interest; cross referencing one or more scaled digital images to derive one or more extrinsic parameters; calibrating each digital imaging sensor with the extrinsic parameters; and transforming and rectifying each digital image such that the region of interest of each digital image is coplanar and aligned.

The method of the present invention may be executed by a computer system comprising one or more interface for receiving digital images from a plurality of digital imaging sensors and a processing unit.

Figure 1:
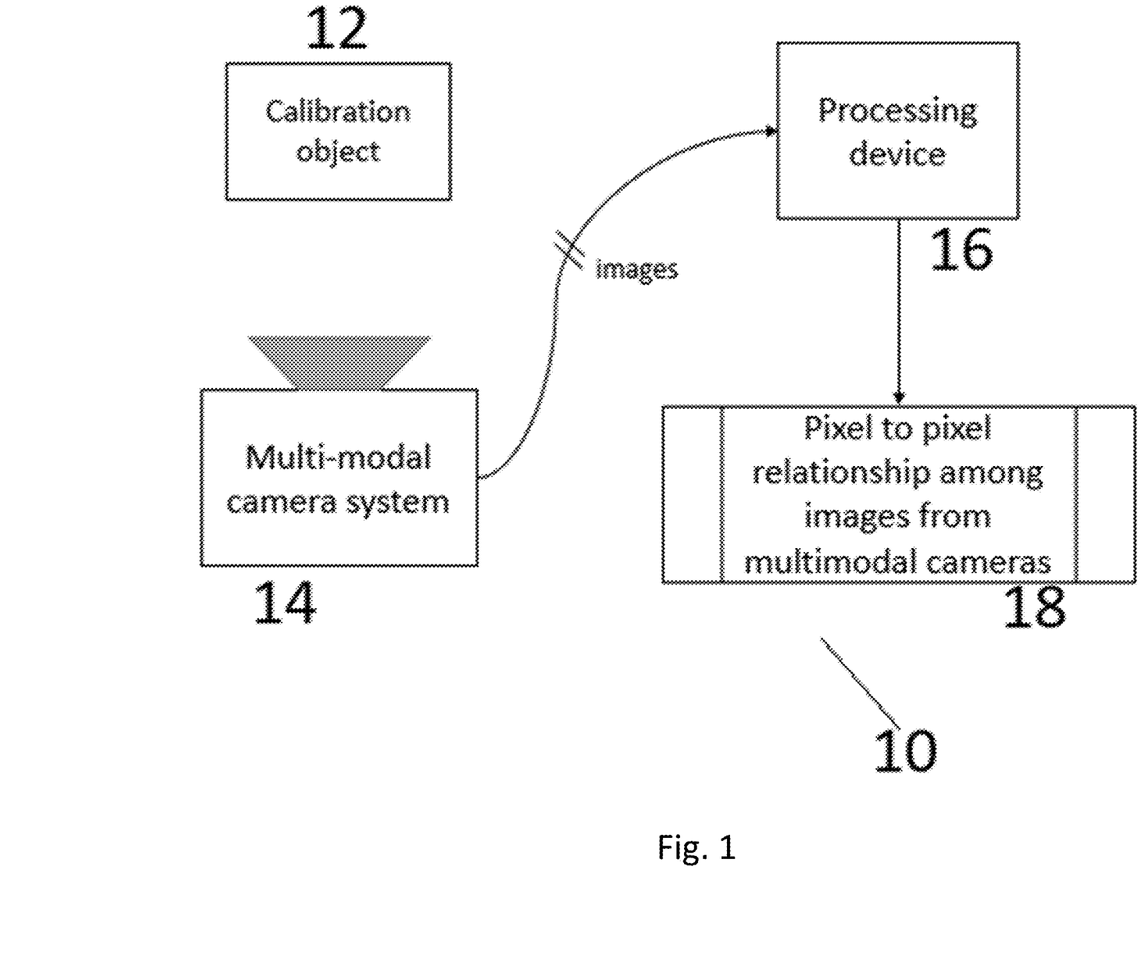
FIG. 1 shows a schematic diagram of an image fusion system according to an embodiment of the present invention.

With reference to FIG. 1, there is shown an example embodiment of an image fusion system 10 for imaging a calibration object 12. The image fusion system 10 comprises a multi-modal camera system 14, a processing device or processor 16, and an image fusion processor 18 for pixel to pixel relationship among images from multimodal cameras.

Figure 2:
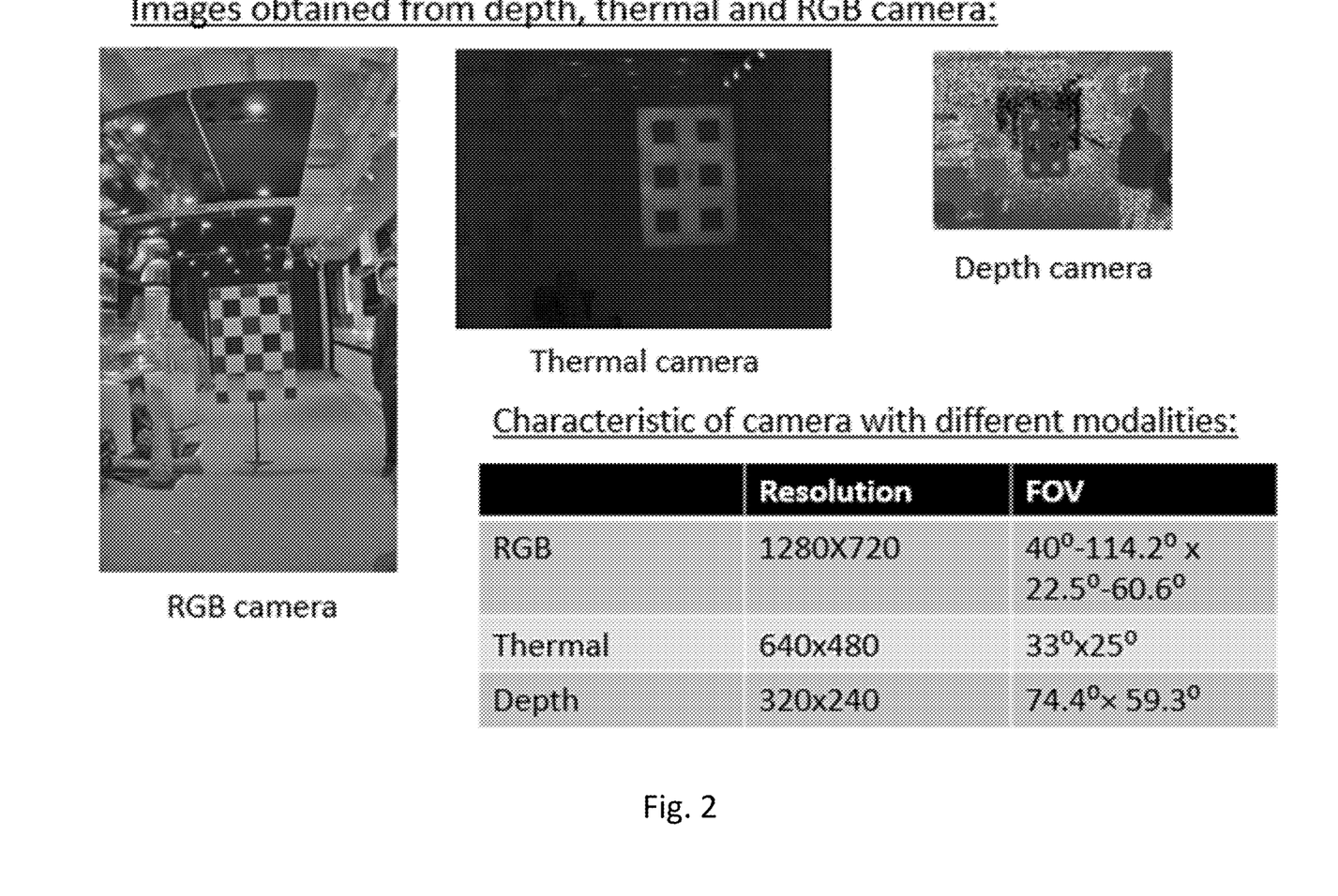
FIG. 2 shows a schematic diagram of the images obtained from multiple modality imaging sensors of an embodiment of the present invention.

The calibration may be associated with any object with one or more feature points that can be identify by all cameras in the multi-modal sensors system 14. Preferably, the system 10 calibrates one or more objects that are visible or identifiable based on one or more identified feature points. In the example as shown in FIG. 2, the calibration objection is a checkerboard-like object, of which its corner points can be seen by all cameras in the system with different modalities.

Preferably, the multi-modal sensors system 14 may comprise sensors of one or more types with different modality. For example, the sensors include an optical image camera, a phase detection sensor, or any electromagnetic wave sensing devices for capturing electromagnetic radiation ranging from gamma ray, x-ray, infrared radiation, microwave, to radio wave depending on the type of applications.

In one embodiment of the present invention, the multi-modal sensors system 14 may comprise three imaging devices: an RGB camera, a thermal camera, and a depth camera. As shown in FIG. 2, the resolution of the RGB camera is 1280×720 and its field of view (FOV) is 40°-114.2°×22.5°-60.6°; the resolution of the thermal camera is 640×480 and its FOV is 33°-114.2°×22.5°-60.6°; the resolution of the depth camera is 320×240 and its FOV is 74.3°×59.3°. In this embodiment, the resolutions and the FOV of the cameras are all different.

In yet another embodiment, all the cameras may have the same modality, and the processing device or processor 16 will be able to detect the modality of the cameras and make no adjustment to the image data.

Figure 3:
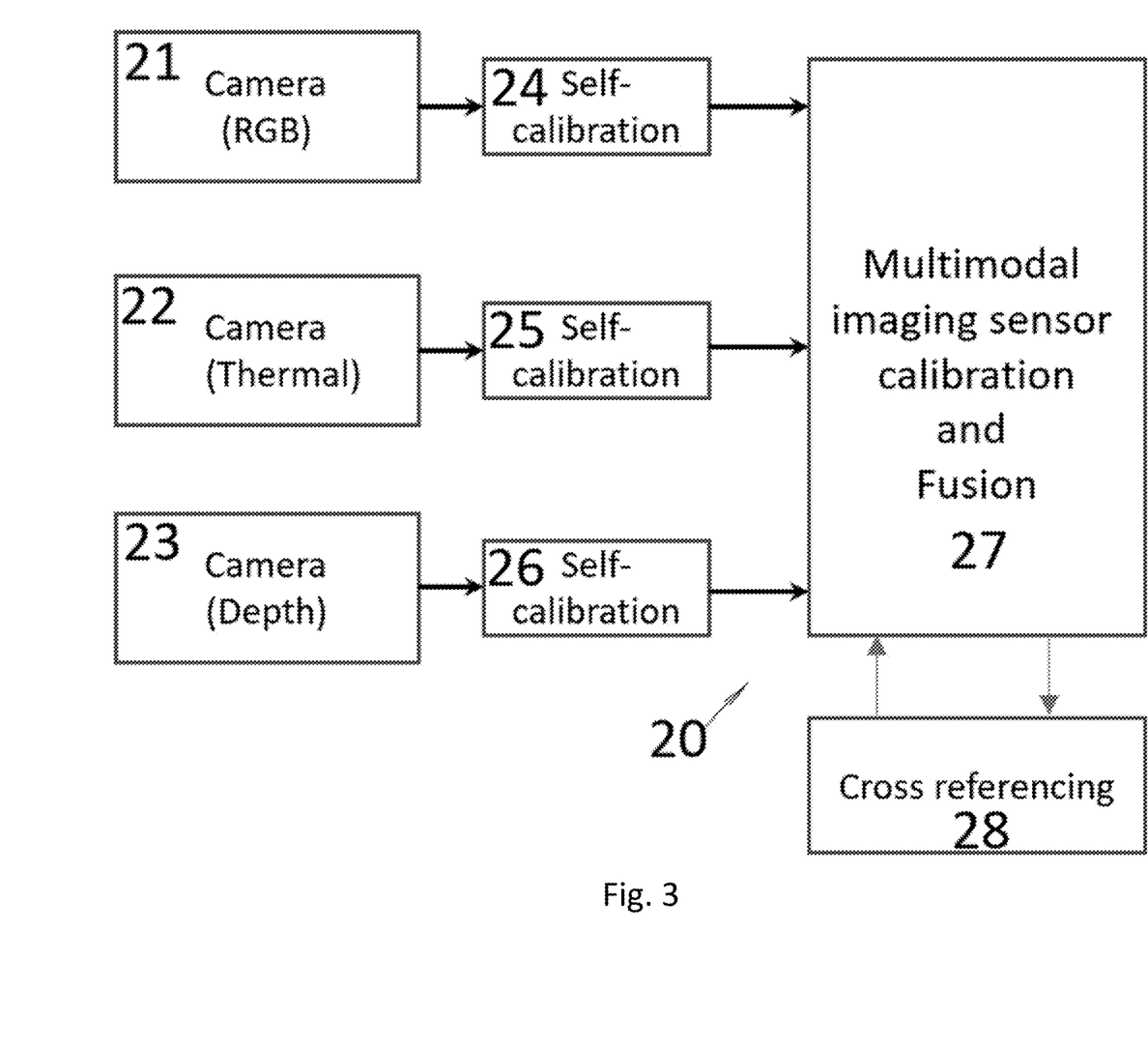
FIG. 3 shows a schematic diagram of a processing device of an embodiment of the present invention.

In one embodiment, the processing device 16 is a computing processor or device that is adapted to execute programmable instructions for digital signal processing. The processing device 16 may acquire the images captured for calibration as inputs and the resulting output is the pixel-to-pixel mapping relationship among the images obtained from the multimodal camera system.

Preferably, each of the sensors 21, 22, 23 may comprise a self-calibration module or self-calibration unit 24, 25, 26 for calibrating an image generated by a corresponding sensor using one or more internal parameters which describe how the camera is set up, such as focal length, position of the optical centre, . . . etc. The self-calibration of each camera 21, 22, 23 by the corresponding self-calibration 24, 25, 26 may reduce noise and distortion in the image the senor generated.

In one preferred embodiment, the intrinsic parameters are physical properties of the sensor, such as the focal length and optical centre. However, in other situation, the camera or sensors 21, 22, 23 takes a sequence of images and carries out self-calibration by comparing one or more features of these images.

In one embodiment, the sensor 21, 22, 23 takes an image with a feature point in a global reference frame P ($P_x$, $P_y$, $P_z$) on to the image plane at point I ($I_x$, $I_y$, f), where f is the focal length of the sensor.

Although there is only one physical focal length, two results for focal lengths may be obtained as the pixels may be rectangular-shaped on the sensor rather than square-shaped. Hence, $f=s_x f_x = s_y f_y$, where $s_x$ and $s_y$ are the effective size of pixels along x-axis and y-axis, respectively.

The coordinate of the image point can be derived by $I=MP$, or $$\begin{bmatrix} I_x \\ I_y \\ \omega \end{bmatrix} = \begin{bmatrix} f_x & 0 & c_x \\ 0 & f_y & c_y \\ 0 & 0 & 1 \end{bmatrix} \begin{bmatrix} P_x \\ P_y \\ P_z \end{bmatrix}$$

where $f_x$ is the focal length in pixels obtained with feature points along an x-axis and $c_x$ is the offset of the centre of the sensor from the optical axis along the x-axis, P is a feature point on the world reference frame, I is the image of the feature point in a homogeneous image plan co-ordinate, M is the transformation matrix.

In this embodiment, the actual focal length and optic centre can be derived with a sequence of images sharing the same feature point. Similarly, with a sequence of images sharing the same feature point, the sensor 21, 22, 23 may also further derive the orientation (rotation) parameters and other intrinsic parameters of the sensor.

Figure 4:
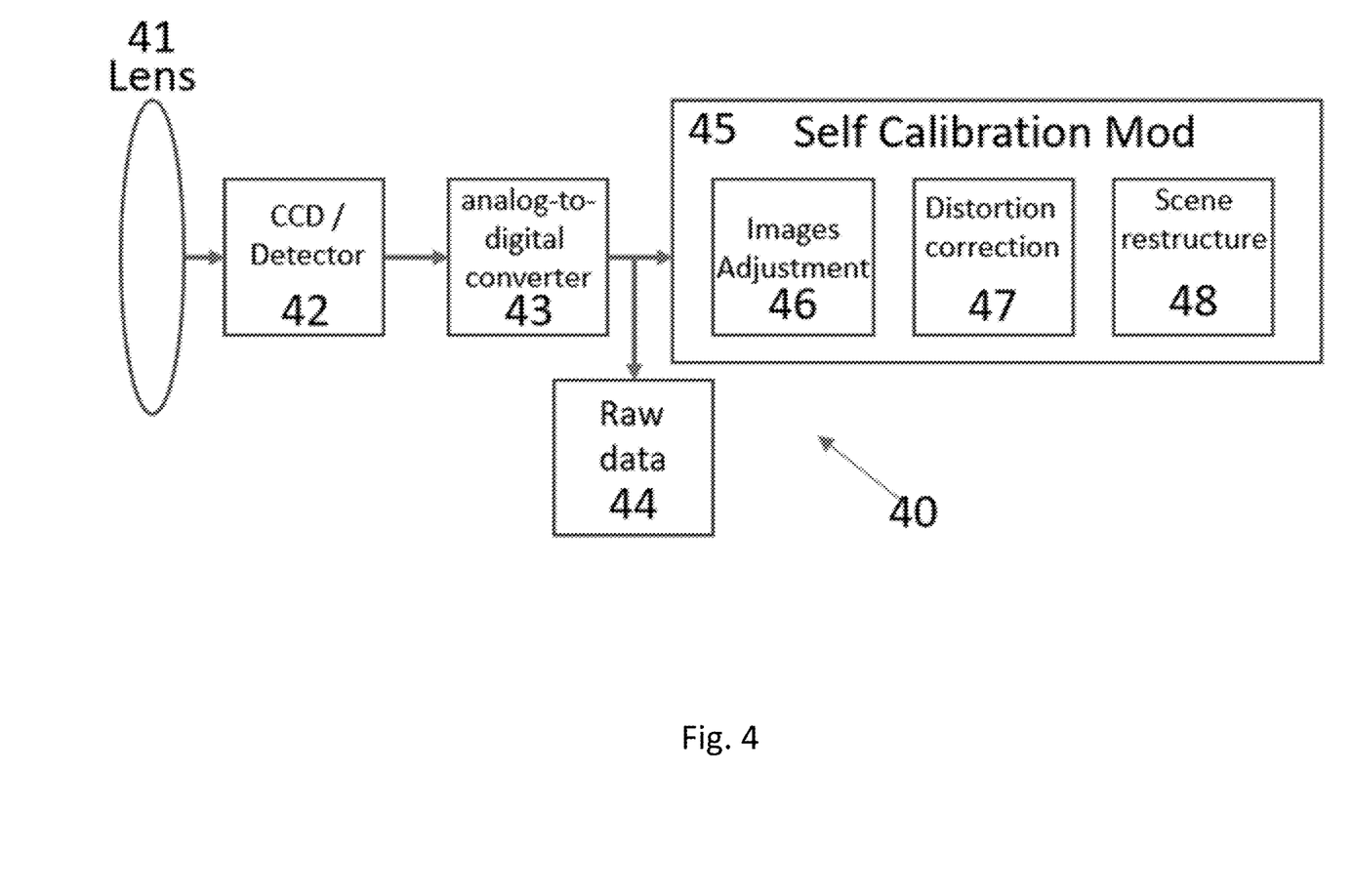
FIG. 4 shows a schematic diagram of a digital imaging sensor of an embodiment of the present invention.

Preferably, the sensors or cameras 21, 22, 23 and the self-calibration unit or module 24, 25, 26 may be integrated into a single unit as shown in FIG. 4. In such arrangement, the sensors or cameras 21, 22, 23 may be separated by a larger distance or even working remotely. Each of the sensors 21, 22, 23 may preprocess the images and the images may be further provided to a multimodal imaging sensor calibration and fusion unit 27 (also refer to as multimodal imaging sensor calibration and fusion module 27) via a wired or wireless communication link such as WiFi. Such systems can usually cover larger areas than a centralized system, and the link between the sensors and the central processing unit can easily be adapted to the environment in which the system will be deployed. Also, as data processing may be directly performed on the sensors, or a processing unit attached to the sensor, it can reduce the processing load on the multimodal imaging sensor calibration and fusion unit 27.

In another embodiment, the self-calibration modules 24, 25, 26 are integrated with the multimodal imaging sensor calibration and fusion module 27 as a centralised unit. As each sensor 21, 22, 23 is physically (or logically) attached to multimodal imaging sensor calibration and fusion module 27, the data streams from the sensors may be received in parallel, making it easy to correlate the absolute time correspondence of the information. The ability to measure and compensate for the delay between each sensor's information streams makes them easy to correlate during the data fusion stage.

Referring to FIG. 4, the sensor or camera 40 comprises a lens 41 and/or other optical components for optically projecting or correcting the images or electromagnetic wave to the charge-coupled device (CCD) or signal detector 42. The CCD/detector may transfer the signal to an analogue-to-digital Convertor 43 (A-D convertor) which may generate a raw data image file 44. In one preferred embodiment, the raw data image file 44 may be stored in a storage/memory device, such as a solid-state storage or a volatile memory for further processing. A copy of the raw data may then be forward to the self-calibration module 45.

In one embodiment, the self-calibration module 45 has an image adjustment module 46 for making adjustment or corrections for the image, such as but not limited to brightness, white balance, sharpness or contrast, etc. The self-calibration module 45 may also comprise a distortion correction module 47 for correcting any lens distortion, and/or a distortion of the image associated with a view angle of the camera. In another embodiment, the self-calibration module 45 comprises a scene restructure module for 3D imaging with homogeneous sensors.

After the self-calibration, the process images of each of the sensors may be forwarded to a processing device 16 cross referencing with a cross referring module 28 and multimodal imaging sensor calibration and fusion with the multimodal imaging sensor calibration and fusion module 27. When the processing device 16 receives the images, the processing device 16 may decide which image will be used as reference depending on the intrinsic parameters obtained from the sensors.

Preferably, the processing device 16 may scale all the images from different cameras or sensors 21, 22, 23 to obtain the overall overlapping area as the region of interest (ROI) for image fusion. The general representation for such scaling may be represented as $I_s = T_s I$.

Figure 5:
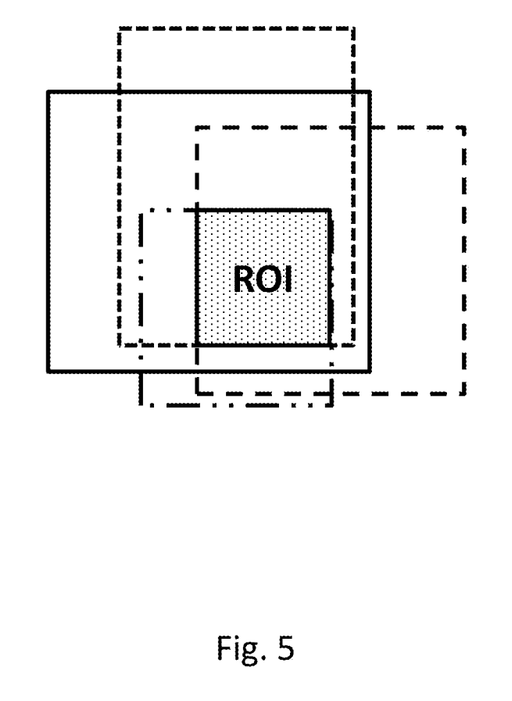
FIG. 5 shows a schematic diagram of a region of interest (ROI) of multiple digital images according to an embodiment of the present invention.

Preferably, the processor devices 16 may be adapted to scale the self-calibrated images according to the ratio of the focal length of each camera and the reference camera (a camera that generates the reference image). The focal length may be an intrinsic parameter obtained from each sensor 21, 22, 23 during capturing the images. The overlapping area among the scaled images may be defined as the region of interest (ROI) as shown in FIG. 5.

Once the ROI is transformed to substantially similar or the same scale, the processing device 16 may perform a cross-calibration process on all cameras for further image rectification. Preferably, the processing device 16 may process a subset of images captured which are within the ROI to perform cameras' cross-calibration and obtain extrinsic parameters of the multimodal sensors 21, 22, 23.

Additionally, the processing device 16 may then transform and rectifies the images within the region of interest for image fusion. In this process, the images obtained from each camera may be rectified with the image obtained from the reference camera using the extrinsic parameters obtained pair by pair.

Figure 6:
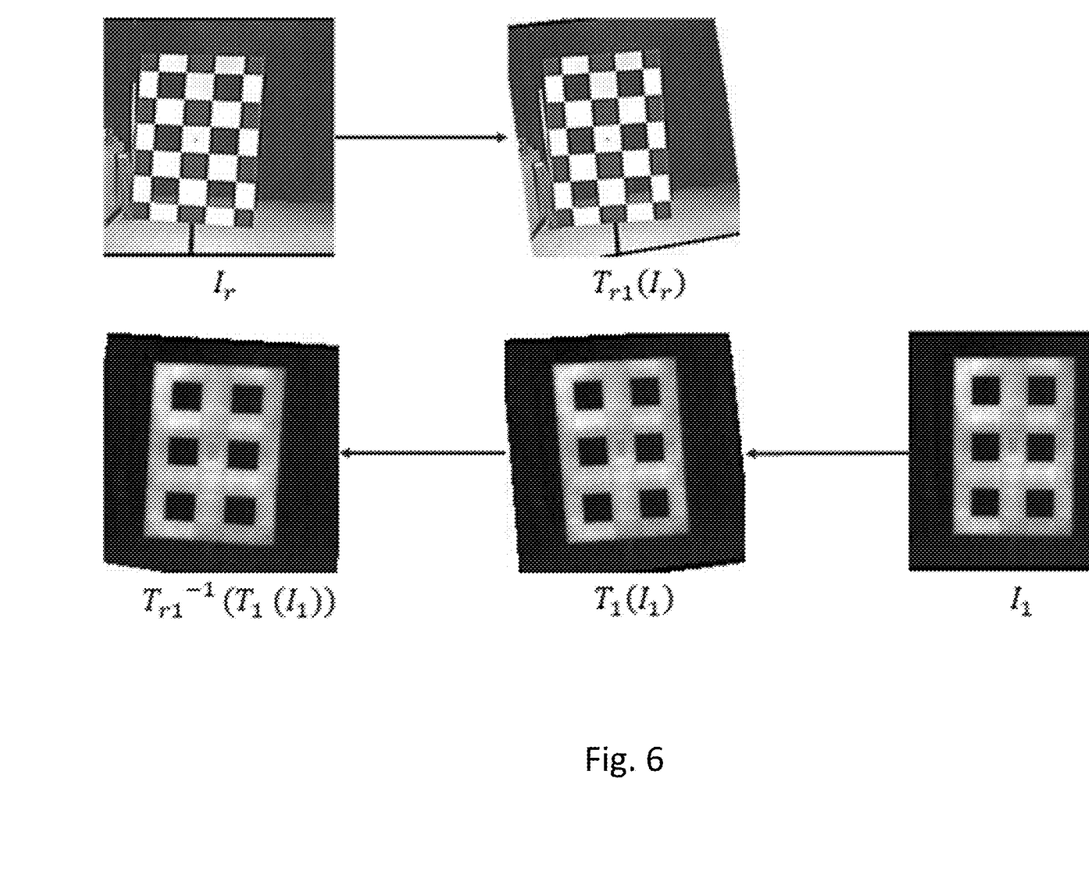
FIG. 6 shows a schematic diagram of a process of image rectification to transform images to the same plane according to an embodiment of the present invention.
Figure 7:
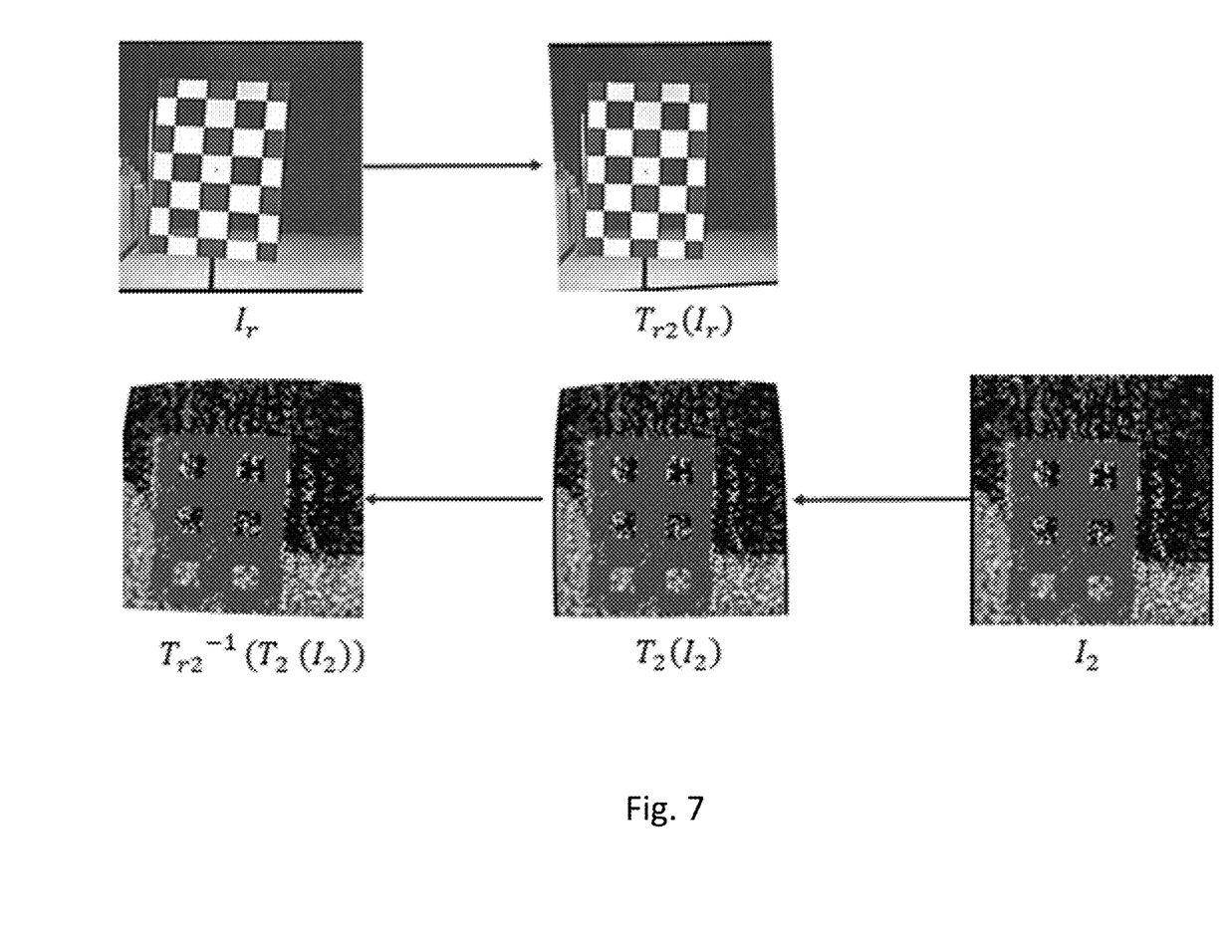
FIG. 7 shows a schematic diagram of another process of image rectification to transform images to the same plane according to an embodiment of the present invention.

Referring to FIG. 6 and FIG. 7, the processing device 16 is adapted to carry out a rectification process which transforms the images $\{I_i\}$ and reference image $\{I_r\}$ with transformation matrices $\{T_i\}$ and $\{T_{ri}\}$, respectively, in a pair-wise manner (i.e. each pair of image owns a pair of transformation matrices $\{T_i\}$ and $\{T_{ri}\}$). This makes multiple pairs of image aligned in a coplanar manner.

The transformations of the images $\{I_i\}$ and $\{I_r\}$ with transformation matrices $\{T_i\}$ and $\{T_{ri}\}$ may only involve putting a pair of images to coplanar. The resulting images may be stored in the memory register of the processing device 16 for the next alignment process. In order to align all images from all the cameras in the multimodal camera system 20 of the present invention to the same camera plane, the processing device 16 will apply transformation matrices $\{T_{ri}^{-1}T_i\}$ on the image $\{I_i\}$ and generates a set of images $\{T_{ri}^{-1}T_1(I_i)\}$ aligning on the same camera plane.

After all images are aligned on the same camera plane, they can be fused together using a set of translation vectors that shift the rectified images along x and y axes. The translation vector $\{S_i\}$ for images $\{I_i\}$ can be obtained through feature points matching where there should be at least one feature point in the image that can be captured by all cameras with a different modality.

The pixel mapping relationship can therefore be described as $$\{S_i(T_{ri}^{-1}T_i(I_i))\} = \{S_j(T_{rj}^{-1}T_j(I_j))\} \text{ for all } i \neq j,$$

and thus, all images can be fused with one another under this pixel mapping relationship.

It will also be appreciated that where the methods and systems of the present invention are either wholly implemented by computing system or partly implemented by computing systems then any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method of calibrating a plurality of digital imaging sensors with different modality for image fusion, comprising the steps of:
   calibrating each digital image generated by a corresponding digital imaging sensor with one or more intrinsic parameters;
   scaling each digital image at a scaling ratio to generate a scaled digital image which has an overlapping region of interest;
   cross referencing one or more scaled digital images to derive one or more extrinsic parameters;
   calibrating each digital imaging sensor with the extrinsic parameters; and
   transforming and rectifying each digital image such that the region of interest of each digital image is coplanar and aligned.

2. A method according to claim 1, further comprising the step of setting a digital imaging sensor as a reference sensor and a digital image generated by the reference sensor as a reference image.

3. A method according to claim 2, further comprising the step of obtaining the intrinsic parameters of each digital imaging sensors.

4. A method according to claim 3, wherein the intrinsic parameters comprises one or more of focal length of the lens, position of an optical centre, and lens distortion.

5. A method according to claim 4, wherein the scaling ratio of each digital image generated by a corresponding digital imaging sensor is equal or substantially equal to the ratio of the focal lengths between the reference sensor and the corresponding digital image sensor.

6. A method according to claim 5, wherein the extrinsic parameters are obtained by comparing each of the scaled digital images.

7. A method according to claim 6, wherein the extrinsic parameters comprises one or more of depth of the object, sensors angle, relative distance.

8. A method according to claim 2, wherein the rectifying step comprises the step of obtaining from each digital imaging sensors with the image obtained from the reference camera using the extrinsic parameters pair by pair.

9. A method according to claim 8, wherein the rectifying step comprises the step of transformation of an image matrix $\{I_i\}$ of each digital image and the image matrix of the reference image $\{I_r\}$, with transformation matrices $\{T_i\}$ and $\{T_{ri}\}$ respectively, in a pairwise manner, wherein each pair of image owns a pair of transformation matrices $\{T_i\}$ and $\{T_{ri}\}$, such that multiple pairs of digital images are aligned in a coplanar manner.

10. A method according to claim 9, wherein transforming an image matrix $\{I_i\}$ of each digital image with transformation matrices $\{T_{ri}^{-1}T_i\}$, such that all transformed images are aligned on a same plane.

11. A method according to claim 1, wherein each of the plurality of digital imaging sensors is placed in front of an object at a different distance or at a different viewing perspective.

12. A method according to claim 11, wherein each of the plurality of digital imaging sensors is adapted to capture multiple digital images of the object.

13. A method according to claim 1, wherein the digital imaging sensors comprises one of a RGB camera, an infrared radiation camera, and a depth camera.

14. A computer system comprises:
   one or more interface for receiving digital images from a plurality of digital imaging sensors;
   a processing unit to execute a method according to claim 1.

15. A processor for calibrating modality images fusion comprising:
   a reference digital image sensor having a reference modal feature;
   one or more digital image sensors, wherein each of which has a modal feature different to the reference modal feature;
   a self-calibration processing unit for calibrating a digital image generated from a sensor with intrinsic parameters of the sensor, and scaling the digital image to obtain an overlapping region of interest; and
   a multimodal imaging sensor calibration and fusion unit for receiving the scaled images from the self-calibration processing unit;
   wherein the multimodal imaging sensor calibration and fusion unit is adapted to cross referencing the scaled digital images to derive one or more extrinsic parameters; calibrate each digital imaging sensor with the extrinsic parameters; and transform and rectify each digital image,
   such that the region of interest of each digital image is coplanar and aligned.

16. A processor according to claim 15, wherein the multimodal imaging sensor calibration and fusion unit is adapted to set a digital imaging sensor as a reference sensor and a digital image generated by the reference sensor as a reference image.

17. A processor according to claim 16, wherein each of the digital imaging sensors is placed in front of an object at a different distance or at a different viewing perspective.

18. A processor according to claim 16, wherein each of the digital imaging sensors is adapted to capture multiple digital images of the object.

19. A processor according to claim 16, wherein the self-calibrating unit is adapted to obtain the intrinsic parameters of each digital imaging sensors.

20. A processor according to claim 19, wherein the intrinsic parameters comprises one or more of focal length of the lens, position of an optical centre, and lens distortion.

21. A processor according to claim 20, wherein the scaling ratio of each digital image generated by a corresponding digital imaging sensor is equal or substantially equal to the ratio of the focal lengths between the reference sensor and the corresponding digital image sensor.

22. A processor according to claim 21, wherein the extrinsic parameters are obtained by comparing each of the scaled digital images.

23. A processor according to claim 22, wherein the extrinsic parameters comprises one or more of depth of the object, sensors angle, relative distance.

24. A processor according to claim 16, wherein the multimodal imaging sensor calibration and fusion unit is adapted to obtain from each digital imaging sensors with the image obtained from the reference camera using the extrinsic parameters pair by pair.

25. A processor according to claim 16, wherein the multimodal imaging sensor calibration and fusion unit is adapted to carry out the transformation of an image matrix $\{I_i\}$ of each digital image and the image matrix of the reference image $\{I_r\}$, with transformation matrices $\{T_i\}$ and $\{T_{ri}\}$ respectively, in a pairwise manner, wherein each pair of image owns a pair of transformation matrices $\{T_i\}$ and $\{T_{ri}\}$, such that multiple pairs of digital images are aligned in a coplanar manner.

26. A processor according to claim 25, wherein transforming an image matrix $\{I_i\}$ of each digital image with transformation matrices $\{T_{ri}^{-1}T_i\}$, such that all transformed images are aligned on a same plane.

27. A processor according to claim 16, wherein the digital image sensors are connected to the self-calibrating unit remotely.

28. A processor according to claim 27, wherein the digital image sensors are connected to the self-calibrating unit through an Ethernet connection.

29. A processor according to claim 27, wherein the digital image sensors are connected to the self-calibrating unit through a Wi-Fi connection.

30. A processor according to claim 16, wherein the self-calibrating unit comprises a plurality of individual calibrating modules, each of the calibrating modules is integrated with a digital imaging sensor.

31. A processor according to claim 16, wherein the digital imaging sensors comprises one of a RGB camera, an infrared radiation camera, and a depth camera.

* * * * *